Patented Oct. 6, 1942

2,297,777

UNITED STATES PATENT OFFICE 2,297,777

ANTHRAQUINONE CARBAZOLE DYES

Walter Kern, Sissach, and Theodor Holbro and Richard Tobler, Riehen, Switzerland, assignors to the firm of Society of Chemical Industry in Basle, Basel, Switzerland No Drawing. Application February 23, 1939, Serial No. 258,094. In Switzerland March 2, 1938

3 Claims. (Cl. 260—316)

This invention relates to the manufacture of vat dyestuffs by treating a compound of the general formula $$(R-NH)_n-R_1$$

(wherein $n$ represents the number 1 or a greater number, each R is the residue of a compound containing a grouping capable of being vatted, at least two cyclic bound carbonyl groups and at most eight condensed hexacarbon rings, and $R_1$ is a phenanthrene residue) with a condensing agent and, if desired, treating the product thus obtained with a halogenating agent.

The compounds of the above formula serving as parent materials may be made by causing a phenanthrene containing as substituents one or preferably two or more halogen atoms or aminogroups, to react with a compound containing a grouping capable of being vatted, at least two cyclic bound carbonyl groups and at most eight condensed hexacarbon rings, as well as at least one amino-group or at least one halogen atom and capable of being coupled with the phenanthrene nucleus.

In the following examples are disclosed many cases of conversions between halogenated phenanthrenes and compounds containing aminogroups capable of being vatted, because this method is very convenient for the production of the starting products. For the present process it is however immaterial by which methods the starting products of the above formula are obtained, that is to say whether the amino-group which determines the coupling originally belonged to the phenanthrene radical or to the compound containing the grouping capable of being vatted.

Besides the said amino-groups or halogen atoms which determine the coupling there may be present any other substituents, preferably incapable of imparting solubility in water.

As groupings capable of being vatted the compounds may contain one or more anthraquinone nuclei which may be condensed with one another, provided that there is still present at least two cyclic bound carbonyl groups and at most eight condensed hexacarbon rings. Under the same conditions there may also be used compounds containing the anthraquinone nucleus which comprise fused-on carbocyclic or heterocyclic rings, for example acridone rings. Finally, anthraquinone derivatives also come into question, in which the carbon atoms in 1- and 9-positions are members of a fused-on ring. Such compounds which come into consideration for the conversion with halogen phenanthrenes are, for example, 1-aminoanthraquinone, 1-amino-4-methoxyanthraquinone, 2-aminoanthraquinone, aminodianthrones, aminoanthanthrones, aminodibenzpyrenequinones, aminoflavanthrones, aminoindanthrones, aminopyranthrones, amino-1:9-anthrapyridones, aminoanthraquinone-acridones, such as for example 4-amino-1:2-anthraquinone-acridone and especially the acyl-aminoanthraquinones, for instance the 1-amino-4-benzoylaminoanthraquinone, the 1-amino-5-benzoylaminoanthraquinone, the 1-amino-5-benzoylamino-8-methoxyanthraquinone, the 1-amino-5:8-dibenzoylaminoanthraquinone, as well as aminoacylaminoanthraquinones in which the residue of the benzoic acid has been changed for the residue of an aliphatic or a heterocyclic or another aromatic-carboxylic acid, for instance the substituted benzoic acids such as parachloro-benzoic acid, cinnamic acid, naphthalene carboxylic acid, anthraquinone-$\beta$-carboxylic acid, pyridine-3-carboxylic acid or acetic acid. All these mentioned compounds may still further contain substituents, for instance halogen, alkyl or alkoxy groups.

The halogen atoms or amino-groups which condition the coupling may have various positions in the phenanthrene nucleus, for example the 10-position, the 6- and 10-positions, the 8- and 10-positions. Also there may be used for the reaction with advantage mixtures of isomeric phenanthrene derivatives, for instance dibromophenanthrenes. Finally, there may be found in the phenanthrene nucleus further substituents, for instance alkoxy groups or alkyl groups with branched or straight chains, as well as halogen.

For producing the reaction the components may with advantage be heated together in a solvent or a diluent, for instance nitrobenzene, naphthalene or amyl alcohol, preferably in the presence of a catalyst, for instance copper or a copper compound, and of an agent binding acid, for instance alkali carbonate and/or anhydrous sodium acetate. For the reaction there may be used 1 mol of a polyhalogen or a polyamino-compound of phenanthrene, for instance 1 mol of a dihalogen phenanthrene and several mols of a compound capable of being vatted, for instance 1-amino-4- or 5-benzoyl-aminoanthraquinone simultaneously or in succession.

The products obtained by this reaction and corresponding with the above general formula are by the process of the invention treated with a condensing agent, for instance an alkaline or especially an acid condensing agent, for instance concentrated sulfuric acid, which in some cases gives rise to a limited sulfonation which is not disturbing. The treatment may occur at ordinary temperature or a higher temperature. Those reaction products react especially freely in the production of which there have been used anthraquinones containing, besides the amino-groups or the halogen which has entered into reaction, substituents, for instance acylated amino-groups in the 4- or 5-position.

In the said treatment with a condensing agent carbazole or similar rings may be formed, and as condensing agents there may be used instead of those already named any that is suitable for producing such ring closure. Such are, for example, chlorosulfonic acid, aluminium chloride and concentrated caustic alkali, if desired in an alcoholic medium.

It is of advantage to treat products obtainable by this invention, if desired directly after the condensation reaction, with an oxidizing agent, for instance alkali nitrite, alkali perborate or alkali hypochlorite, preferably in acid medium.

A further development of the invention consists in causing the product, insofar as it still contains a substituent such as halogen suitable for reaction, to react with an amine containing a group capable of being vatted and treating the product thus obtained further with a condensing agent if desired.

The products obtained may be purified in known manner by reprecipitation or re-vatting or may be converted into a form especially suitable for the use to which they are to be put. They dye and print animal and especially cellulosic fibres, for instance cotton, linen, artificial silk, artificial staple fibre and mixtures of these fibres by methods usual for vat dyestuffs, the tints being very fast, for instance to washing, chlorine, kier boiling, and, particularly, light. They may also be used in the form of their leucosulfuric acid ester salts obtainable in the manner usual for the class of dyestuff.

The following examples illustrate the invention, the parts being by weight; the relationship between the parts by volume and parts by weight is that of the litre to the kilo:

*Example 1*

1 part of 5'-benzoylamino-1'-anthraquinonyl-10-aminophenanthrene of the formula

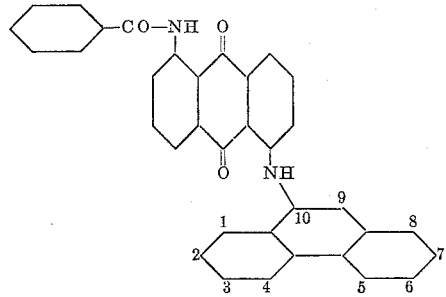

is introduced at 0–5° C. in 18.4 parts of sulfuric acid of 96 per cent strength and the mixture is stirred for 16 hours at 0–5° C. After transferring to ice, there is added 0.3 part of sodium nitrite and stirring is continued for 6 hours at 0–5° C. The dyestuff thus obtained of the probable formula

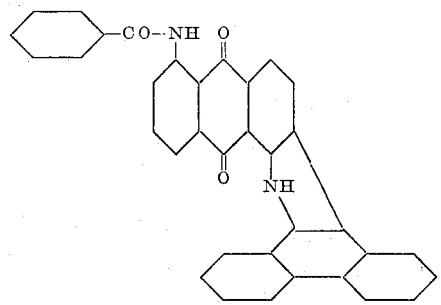

is filtered, washed neutral and made into a paste with water. It dyes cotton in a red vat yellow-brown tints.

By the same method there is obtained from 4'- benzoyl-amino - 1-anthraquinonyl-10-amino-phenanthrene a dyestuff which dyes cotton in a red vat violet-brown tints.

The 5'- or 4'-benzoylamino-1'-anthraquinonyl-10-aminophenanthrene used in this example may be made in the following manner:

12.9 parts of 10-bromophenanthrene made by brominating phenanthrene in glacial acetic acid as described in Annalen der Chemie, vol. 398, page 125, 7.5 parts of anhydrous sodium carbonate, 7.5 parts of anhydrous sodium acetate, 17.1 parts of 1-amino-5-benzoylaminoanthraquinone and 0.7 part of cuprous chloride are suspended in 200 parts of dry nitrobenzene and the whole is stirred for 16 hours at 190–200° C. The mixture is filtered hot, the residue washed with nitrobenzene as well as with benzene and alcohol and for purification is extracted by boiling first with dilute hydrochloric acid and then with alcohol. There is obtained in good yield a red crystalline powder which colors strong sulfuric acid olive, melts at 300–310° C. and can be vatted with great difficulty.

By analogous condensation of 10-bromophenanthrene with 1-amino-4-benzoylaminoanthraquinone there is obtained 4'-benzoylamino-1'-anthraquinonyl-10-aminophenanthrene which is a blue crystalline powder coloring concentrated sulfuric acid olive, melting at 310–320° C. and capable of being vatted with great difficulty.

*Example 2*

1 part of di-(5'-benzoylamino-1'-anthraquinonyl)-6:10-diaminophenanthrene of the formula

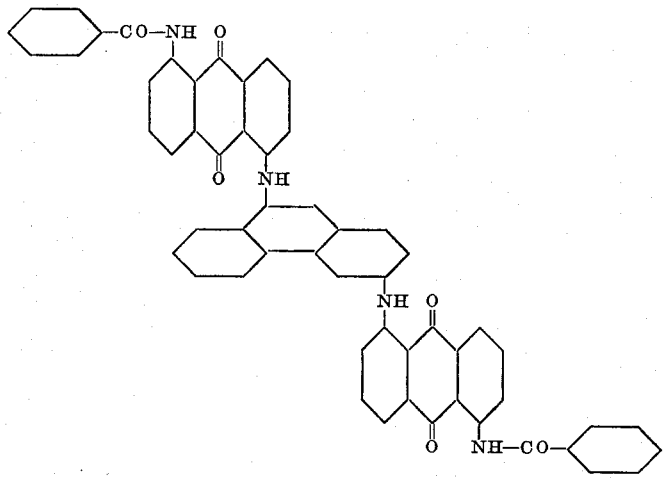

is introduced at 50° C. into 18.4 parts of sulfuric acid of 96 per cent strength and the whole is stirred for 2 hours at 50° C. It is now introduced into ice, 0.3 part of sodium nitrite is added and stirring is continued for 16 hours at 0–5° C. The dyestuff thus obtained of the probable formula

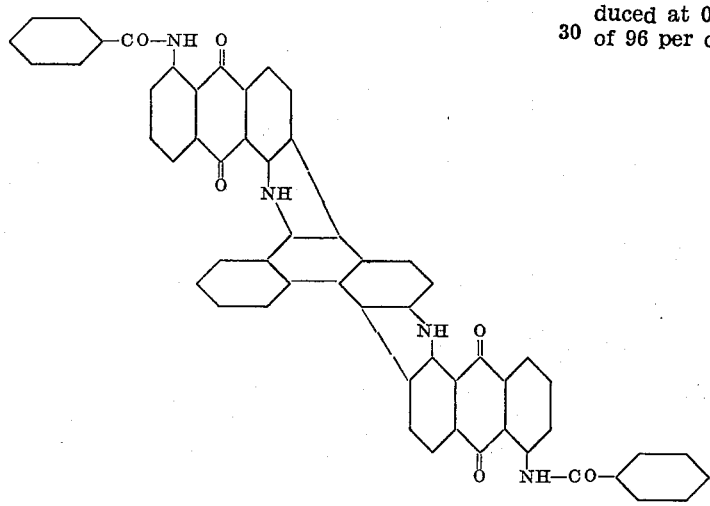

is filtered, washed neutral and made into a paste with water. It dyes cotton in a red vat very fast red-brown tints.

A dyestuff of similar properties is obtained by the action of sulfuric acid of 96 per cent strength at 0–5° C. and after treatment with sodium nitrite at 0–5° C.

The di-(5'-benzoylamino-1'-anthraquinonyl)-6:10-diaminophenanthrene used in this example may be obtained as follows:

5 parts of 6:10-dibromophenanthrene of melting point 145–146° C. obtainable by brominating 10-bromophenanthrene in carbon bisulfide as described in Annalen der Chemie, vol. 321, page 248, or by brominating 10-bromophenanthrene in carbon tetrachloride, 4.5 parts of anhydrous sodium carbonate, 4.5 parts of anhydrous sodium acetate, 10.5 parts of 1-amino-5-benzoylamino-anthraquinone and 0.4 part of cuprous chloride are together suspended in 100 parts of dry nitrobenzene and the whole is stirred for 40 hours at 195–205° C. The mixture is filtered hot and the solid matter is washed with nitrobenzene as well as with benzene and alcohol and for purification is extracted by boiling first with dilute hydrochloric acid and then with alcohol. There is obtained in good yield a dark brown crystalline powder which colors concentrated sulfuric acid green, melts at 415–420° C. and is capable of being vatted with great difficulty.

*Example 3*

1 part of di-(4'-benzoylamino-1'-anthraquinonyl)-6:10 diaminophenanthrene is introduced at 0–5° C. into 18.4 parts of sulfuric acid of 96 per cent strength and the whole is stirred for 16 hours at 0–5° C. It is now introduced into ice, 0.3 part of sodium nitrite is added and stirring is continued for 8 hours at 0–5° C. The dyestuff thus obtained of the probable formula

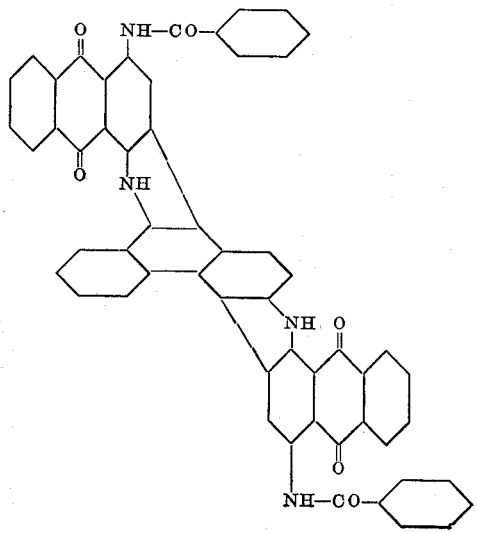

is filtered, washed neutral and made into a paste with water. It dyes cotton in a red vat violet-brown tints.

The di-(4'-benzoylamino-1'-anthraquinonyl)-6:10-di-aminophenanthrene is obtained in manner analogous to that described in Example 2 last paragraph by reaction of 6:10-dibromophenanthrene with 1-amino-4-benzoylaminoanthraquinone in the form of a greenish-black crystalline powder which colors concentrated sulfuric acid olive, melts at 380-385° C. and is capable of being vatted with great difficulty.

*Example 4*

1 part of di-(5'-acetylamino-1'-anthraquinonyl)-6:10-diaminophenanthrene is introduced at 0° C. into 18 parts of sulfuric acid of 96 per cent strength, and the whole is stirred for 16 hours at 0° C. The solution is now introduced into ice and the dyestuff thus obtained receives an addition of 0.3 part of sodium nitrite and the whole is stirred for 6 hours at 0-5° C. The dyestuff of the probable formula

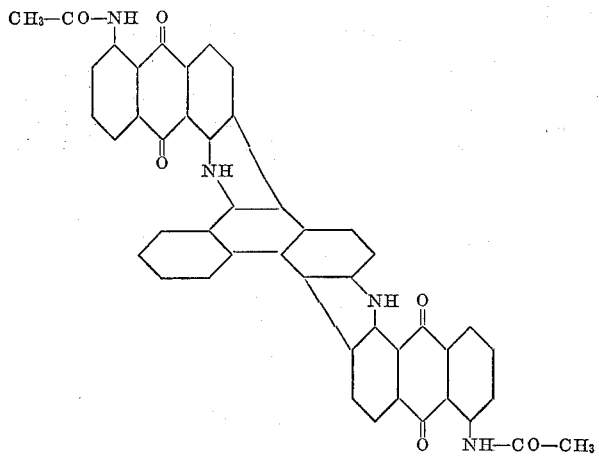

dyes cotton in a red vat reddish brown tints of good properties of fastness.

From di-(5'-(para-chloro)-benzoylamino-1'-anthraquinonyl) - 6:10 - diaminophenanthrene there is obtained by the same process a dyestuff which dyes cotton in a red vat a reddish brown tint of somewhat poorer tinctorial strength.

The analogous dyestuff obtained from di-5'-cinnamoylamino-1'-anthraquinonyl-6:10-diaminophenanthrene dyes cotton is a yellow-red vat fast yellow-brown tints.

The (5'-($\beta''$-anthraquinonoyl-amino-1'-anthraquinonyl)-6:10-diaminophenanthrene yields by the same process a dyestuff which dyes cotton in a red vat yellow-red brown tints.

The parent materials used in this example may be obtained as follows:

Di-(5'-acetylamino-1'-anthraquinonyl) - 6:10-diaminophenanthrene is prepared as follows:

1.7 parts of 6:10-dibromophenanthrene, 1.5 parts of fused sodium acetate, 1.5 parts of anhydrous sodium carbonate, 2.8 parts of 1-amino-5-acetylaminoanthraquinone and 0.15 part of cuprous chloride are together heated in 40 parts of dry nitrobenzene for 16 hours to boiling. The product is filtered hot, washed with nitrobenzene and alcohol and extracted with boiling dilute hydrochloric acid. It is a dark brown powder vatted with difficulty; it is soluble in concentrated sulfuric acid to a grey green solution.

Di-(5'-para-chlorobenzoylamino-1'-anthraquinonyl)-6:10-diaminophenanthrene is made as follows:

In the prescription contained in the last preceding paragraph the 1-amino-5-para-chlorobenzoylaminoanthraquinone is substituted for the 1-amino-5-acetylaminoanthraquinone, whereby there is obtained a brown powder which cannot be vatted, dissolves in concentrated sulfuric acid to a green solution and melts at 390-395° C.

Di-(5'-cinnamoylamino - 1' - anthraquinonyl)-6:10-diaminophenanthrene is made as follows:

With 1-amino - 5 - cinnamoylaminoanthraquinone there is obtained by a reaction analogous to that described above a brown powder which cannot be vatted, melts with decomposition at 350-360° C. and dissolves in concentrated sulfuric acid to a brown-olive solution.

Di-(5'-$\beta''$-anthraquinonoylamino - 1' - anthraquinonyl)-6:10-diaminophenanthrene is made as follows:

By the same reaction 1 mol of 6:10-dibromophenanthrene and 2 mols of 1-amino-5-$\beta'$-anthraqinonoyl-aminoanthraquinone yield a black-brown powder which melts at 410° C., is soluble in concentrated sulfurnic acid to a green solution and dyes cotton in a red vat olive grey tints.

*Example 5*

24 parts of anhydrous aluminium chloride are mixed with 6 parts of common salt and the mixture is fused while stirring at 120° C. There is then added 1 part of di-(1'-anthraquinonyl)-6:10-diaminophenanthrene and the melt is stirred for 2 hours at 120-125° C. Finally the mass is introduced into ice and the mixture is boiled with dilute hydrochloric acid and the dyestuff thus obtained is filtered. It dyes cotton in a blue-red vat reddish brown tints.

The di-(1'-anthraquinonyl) - 6:10 - diamino-phenanthrene may be made as follows:

5 parts of 6:10-dibromophenanthrene, 6.7 parts of 1-aminoanthraquinone, 4.5 parts of anhydrous sodium carbonate, 4.5 parts of anhydrous sodium acetate and 0.4 part of cuprous chloride are mixed with 84 parts of dry nitrobenzene and the mixture is boiled for 16 hours while stirring. It is then filtered hot and the solid matter purified in the usual manner. There is thus obtained in good yield a black-brown crystalline powder soluble in concentrated sulfuric caid to an olive solution, melting at 375-380° C. and incapable of being vatted.

Example 6

1 part of the product of the reaction of 1 mol 6:10-dibromophenanthrene with 2 mols 4-aminoanthraquinone-1(N)-2-benzacridone is introduced at 120° C. into a melt of 24 parts of aluminium chloride and 6 parts of sodium chloride. After stirring at 120–125° C. for 2 hours the mass is introduced into ice and the whole boiled with dilute hydrochloric acid: the dyestuff

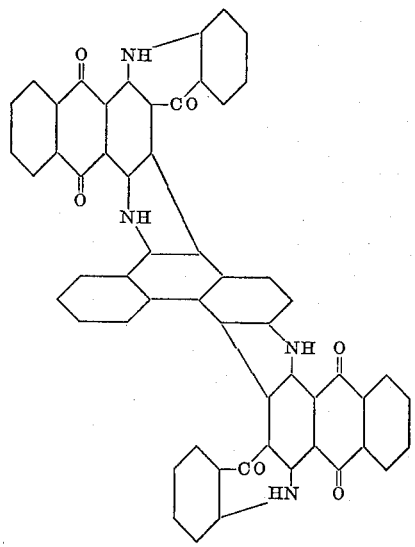

thus precipitated is filtered and washed. It dyes cotton in a brown vat olive grey tints.

If the same parent material is treated at 20° C. for 20 hours with sulfuric acid of 96 per cent strength there is obtained a dyestuff which dyes cotton in a violet-brown vat blue-grey. This dyestuff contains sulfur.

A melt of 1 part of the same parent material, 25 parts of caustic alkali and 16 parts of absolute ethyl alcohol is heated at 180° C. for 2 hours. There is obtained by the usual method of working up a dyestuff which dyes cotton in a red-brown vat strong greenish grey tints.

The parent material used in this example may be made as follows:

3.36 parts of 6:10-dibromophenanthrene, 6.8 parts of 4-aminoanthraquinone-1(N)-2-benzacridone, 3 parts of anhydrous sodium carbonate, 3 parts of anhydrous sodium acetate and 0.3 part of cuprous chloride are suspended in 70 parts of nitrobenzene and the whole is heated to boiling while stirring. When the reaction is complete, the mass is filtered hot and the solid matter purified as usual. The dyestuff obtained in good yield is a blue-green crystalline powder soluble in concentrated sulfuric acid to a black-violet solution and dyeing cotton in a red vat green.

Example 7

3 parts of a product of the reaction of 1 mol 6:10-dibromophenanthrene with 1 mol 1-amino-5-benzoylaminoanthraquinone (see below) are introduced into 55 parts of sulfuric acid of 96 per cent strength and the mixture is stirred for 5 hours at room temperature. The mass is now poured upon ice, the precipitated dyestuff is filtered, washed and dried. It is a dark brown powder soluble in concentrated sulfuric acid to a green solution and dyeing cotton yellow-brown in a red-brown vat.

1.8 parts of the dyestuff obtained in the last preceding paragraph is caused to react with 1.1 part of 1-amino-5-benzoylaminoanthraquinone in boiling nitrobenzene in the presence of anhydrous sodium acetate, anhydrous sodium carbonate and cuprous chloride. There is obtained a dark olive brown powder which does not melt below 450° C., dissolves in concentrated sulfuric acid to a bluish green solution and dyes cotton in a red-brown vat olive-brown tints.

1 part of the product in reaction obtained in the second paragraph of this example is introduced into 18 parts of sulfuric acid of 96 per cent strength and the whole is stirred for 5 hours at 120° C. The mass is then poured on ice, 0.3 part of sodium nitrite is added and stirring is continued for 15 hours at 0–5° C. The red-brown dyestuff thus obtained is practically identical with that obtained in Example 2.

The same dyestuff is obtained by treating the product of the reaction of mono-(5'-benzoylamino-1'-anthraquinonyl)-amino-mono-bromophenanthrene and 1-amino-5-benzoylaminoanthraquinone with concentrated sulfuric acid and subsequently oxidizing with nitrite. The parent material used in the first paragraph of this example may be made as follows:

25.2 parts of 6:10-dibromophenanthrene, 17.1 parts of 1-amino-5-benzoylaminoanthraquinone, 7.5 parts of anhydrous sodium carbonate, 7.5 parts of fused sodium acetate and 0.8 part of cuprous chloride are suspended in 350 parts of dry nitrobenzene, and the whole is heated gradually from 120–180° C. in the course of 2 hours. It is then filtered hot and the filtrate is mixed with 400 parts of alcohol at 80° C. and the mixture is boiled for a short time. After cooling, the product which has separated is filtered and washed with alcohol. It is a brownish-black powder melting with decomposition at 270–280° C., soluble in concentrated sulfuric acid to a brown olive solution and incapable of being vatted. Analysis shows it to be a mono-(5'-benzoylamino-1'-anthraquinonyl)-amino-monobromophenanthrene.

If this last-named compound is caused to react in the usual manner with a second mol of 1-amino-5-benzoylaminoanthraquinone there is obtained a parent material used in the fourth paragraph of this example, which corresponds with that described in Example 2, last paragraph.

Example 8

1 part of the product of reaction obtainable in the usual way from 1 mol mono-(5'-benzoylamino-1'-anthraquinonyl) - amino - mono - bromophenanthrene (see paragraph 6 of Example 7) and 1 mol of 1-amino-4-benzoylaminoanthraquinone is introduced into 18 parts of sulfuric acid of 96 per cent strength, and the mixture is stirred for 5 hours at room temperature. The whole is now poured upon ice, 0.3 part of sodium nitrite is added and stirring is continued for 15 hours at 0–5° C. The dyestuff obtained dyes cotton violet-brown tints in a red-brown vat.

A similar dyestuff is obtained if for the treatment with sulfuric acid of high percent strength there is used a product obtained by simultaneous reaction of 1 mol 6:10-dibromophenanthrene with 1 mol of 1-amino-4-benzoylaminoanthraquinone and 1 mol of 1-amino-5-benzoylaminoanthraquinone.

Example 9

1 part of di-(5'-benzoylamino-1'-anthraquinonyl)-8:10-diaminophenanthrene of the formula

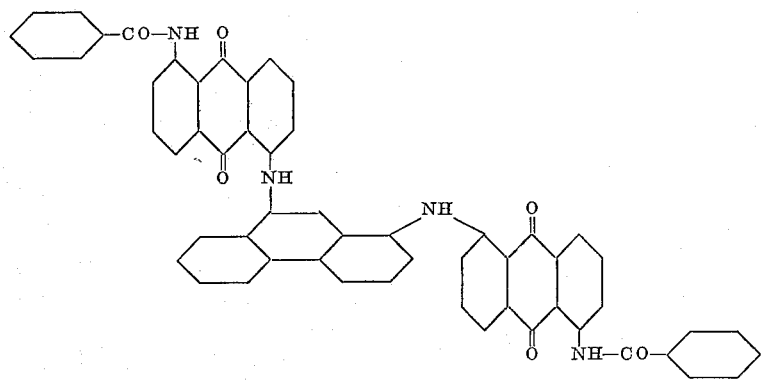

is introduced into 18 parts of sulfuric acid of 96 per cent strength, and the whole is stirred for 5 hours at 20° C. The solution is poured on ice, 0.3 part of sodium nitrite is added and stirring is continued for 16 hours at 0–5° C. The dyestuff thus obtained of the probable formula

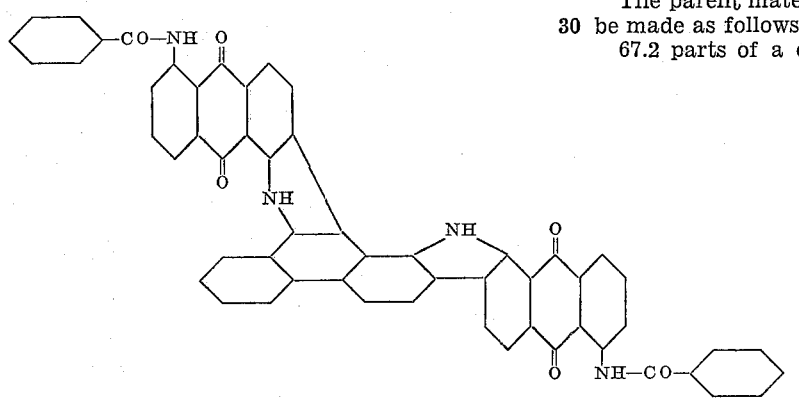

dyes cotton brown olive tints in a yellow-brown vat.

The parent material used in this example may be made as follows:

16.8 parts of 8:10-dibromophenanthrene of melting point 125° C., 34.2 parts of 1-amino-5-benzoylaminoanthraquinone, 15 parts of anhydrous sodium acetate, 15 parts of anhydrous sodium carbonate and 1.5 parts of cuprous chloride are together suspended in 200 parts of dry nitrobenzene and the whole is boiled while stirring for 16 hours. It is then filtered hot and the solid matter is washed with nitrobenzene and alcohol, extracted with boiling hydrochloric acid and dried. The brown crystalline powder thus obtained melts with decomposition at 370–375° C., is not capable of being vatted and dissolves in concentrated sulfuric acid to a green solution.

The di-bromophenanthrene used in this example is produced besides 6:10-dibromophenanthrene by the bromination of 10-bromophenanthrene in carbon tetrachloride (compare Example 2) and may be isolated from the first mother liquors which are obtained by recrystallizing the crude bromination product.

When recrystallized from alcohol it forms slender yellowish needles which melt sharply at 125° C.

Example 10

1 part of the product of the reaction of a mixture of different dibromophenanthrenes and 1-amino-5-benzoylaminoanthraquinone is introduced into 18 parts of sulfuric acid of 96 per cent strength and the whole is stirred for 5 hours at 20° C. The solution is then poured upon ice, 0.3 part of sodium nitrite is added and the whole is stirred for 16 hours at 0–5° C. The dyestuff thus obtained is filtered and washed. It dyes cotton brown in a red-brown vat.

The condensation may also be performed with a smaller proportion of sulfuric acid.

The parent material used in this example may be made as follows:

67.2 parts of a crude mixture melting at 95–110° C. of isomeric dibromophenanthrenes obtainable by brominating phenanthrene in nitrobenzene are caused to react in the usual manner with 137 parts of 1-amino-5-benzoylaminoanthraquinone. The product thus obtained is incapable of being vatted and is a brown powder which melts at 405–415° C. and dissolves in concentrated sulfuric acid to a green solution.

Example 11

1 part of di-(5'-benzoylamino-1'-anthraquinonyl)-diamino-1-methyl-7-isopropylphenanthrene is introduced into 18 parts of sulfuric acid of 96 per cent strength and the whole is stirred for 5 hours at 20° C. The solution is then introduced into ice, 0.3 part of sodium nitrite is added and the whole is stirred for 16 hours at 0–5° C. The dyestuff thus obtained dyes cotton red-brown in a red-brown vat.

The parent material used in this example may be made as follows:

To a cold solution of 117 parts of retene (1-methyl-7-isopropylphenanthrene) in 480 parts of carbon tetrachloride is added 0.5 part of ferric chloride and there are then gradually added by drops and in the dark 168 parts of bromine. When the evolution of hydrogen bromide is finished, the solution is distilled and the residue which is a tough sticky mass is repeatedly crystallized from glacial acetic acid or alcohol. Slender colorless needles are thus obtained which melt at 122° C. Analysis shows that they are a dibromo-1-methyl-7-isopropylphenanthrene.

19.6 parts of the product melting at 122° C. thus obtained, 34.2 parts of 1-amino-5-benzoyl-aminoathraquinone, 15 parts of anhydrous sodium carbonate, 15 parts of anhydrous sodium acetate and 1.5 parts of cuprous chloride are together mixed with 400 parts of dry nitrobenzene and the whole is boiled while stirring for 16 hours.

The product which has been precipitated is filtered hot, washed with nitrobenzene and alcohol and extracted with boiling dilute hydrochloric acid. There is thus obtained a brown powder which melts at 400° C. with decomposition and dissolves in concentrated sulfuric acid to a grass green solution.

*Example 12*

1 part of di-(4'-benzoylamino-1'-anthraquinonyl) - 3 : 6 - diamino - 9:10-dimethoxyphenanthrene of the formula

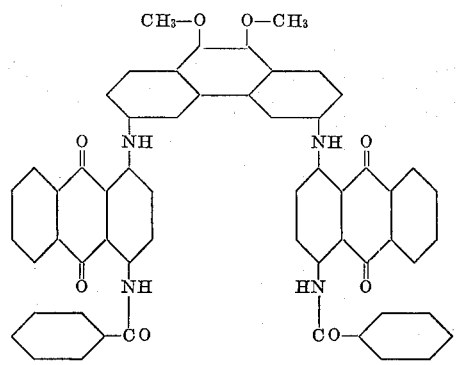

is introduced at 0–5° C. into 18.4 parts of sulfuric acid of 96 per cent strength and the whole is stirred for 16 hours at 0–5° C. The mass is then introduced into ice, 0.3 part of sodium nitrite is added and the whole is stirred for 8 hours at 0–5° C. The dyestuff thus obtained is filtered, washed and made into a paste with water. It dyes cotton reddish-black-brown tints in a red vat. By analogous treatment with sulfuric acid of 90 per cent strength and subsequent oxidation with nitrite there is obtained a dyestuff of the probable formula

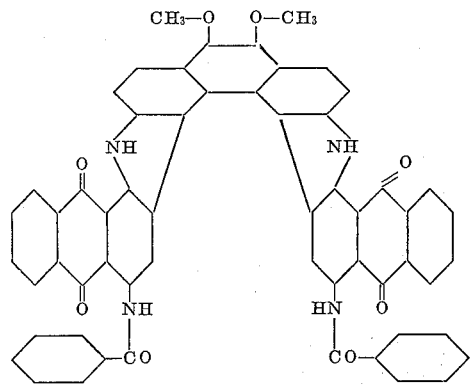

which dyes cotton black-brown in a red vat.

The parent material used in this example may be made as follows:

50 parts of 3:6-dibromophenanthrene-quinone, made as described in Journ. prakt. Chem. 134, page 167, 50 parts of sodiumhydrosulfite, 500 parts of water and 315 parts of alcohol are heated together to boiling for ¼ hour under reflux.

The product which has become colorless is poured into water, quickly filtered and washed with water. It is then suspended in 1,000 parts of water and 200 parts of alcohol and after addition of 14 parts of sodium hydrosulfite while stirring it is dissolved by adding caustic soda lye of 30 per cent strength at 40° C. In the course of 45 minutes 81 parts of dimethylsulfate are added by drops and the whole is finally heated for ½ hour at 80° C. During the whole operation as soon as the mixture becomes dark owing to oxidation there must be added some sodium hydrosulfite, in all 20 parts. When the reaction is complete, the solid matter is filtered hot and washed with caustic soda lye of 1 per cent strength and finally with water; it is recrystallized from alcohol. The 3:6-dibromo-9:10-dimethoxy-phenanthrene obtained in good yield crystallizes in yellowish needles which melt at 155–156° C.

9.9 parts of 3:6-dibromo-9:10-dimethoxyphenanthrene, 7.5 parts of anhydrous sodium carbonate, 7.5 parts of anhydrous sodium acetate, 17.5 parts of 1-amino-4-benzoyl-aminoanthraquinone and 0.7 part of cuprous chloride are together suspended in 200 parts of nitrobenzene and the suspension is stirred for 18 hours at 195–205° C. The mixture is then filtered hot and the solid mattter is washed with nitrobenzene, as well as with benzene and alcohol and for purification extracted with boiling dilute hydrochloric acid and then with alcohol. There is obtained in good yield a dark blue-green crystalline powder soluble in concentrated sulfuric acid to a grey olive solution; it melts at 335–340° C. and is vatted with great difficulty.

*Example 13*

1 part of di-(5'-benzoylamino-1'-anthraquinonyl) - 3 : 6 - diamino - 9:10-dimethoxyphenanthrene obtained in manner analogous to that described in Example 12 is introduced at 0–5° C. into 18.4 parts of sulfuric acid of 96 per cent strength, and the whole is stirred for 16 hours at 0–5° C. It is now introduced into ice, 0.3 part of sodium nitrite is added and stirring is continued for 8 hours at 0–5° C. The dyestuff thus obtained is filtered, washed and made into a paste with water. It dyes cotton yellowish brown tints in a red vat.

A dyestuff with similar properties is obtained by treatment for 5 hours with sulfuric acid of 96 per cent strength at 25° C. and subsequent oxidation with nitrite.

*Example 14*

1 part of tetra-(5'-benzoylamino-1'-anthraquinonyl)-tetraminophenanthrene is introduced into 18 parts of sulfuric acid of 96 per cent strength, and the whole is stirred for 15 hours at 20° C. The solution is introduced into ice, 0.3 part of sodium nitrite is added and stirring is continued for 2 hours at 0–5° C. The precipitated dyestuff is filtered and washed. It dyes cotton black-brown tints in a brown vat. The tetra-(5-benzoylamino-1'- anthraquinonyl) - tetraminophenanthrene used in this example may be prepared as follows:

10 parts of crude tetrabromophenanthrene of melting point 200–206° C., obtained by the action of bromine on phenanthrene in a sealed tube at 130–140° C., 27.4 parts of 1-amino-5-benzoylaminoanthraquinone, 10 parts of anhydrous sodium carbonate, 10 parts of fused sodium acetate and 1 part of cuprous chloride are together heated for 20 hours with 1000 parts of dry nitrobenzene to boiling. The precipitated product is filtered hot, washed with nitrobenzene and alcohol and extracted with boiling dilute hydrochloric acid. It is a black powder which dissolves in concentrated sulfuric acid to an olive green solution and is incapable of being vatted.

a product which is identical with that obtained by causing concentrated sulfuric acid to react with di-(5'-benzoyl-amino-1'-anthraquinonyl)-8:10-diaminophenanthrene.

3. The vat dyestuff of the formula

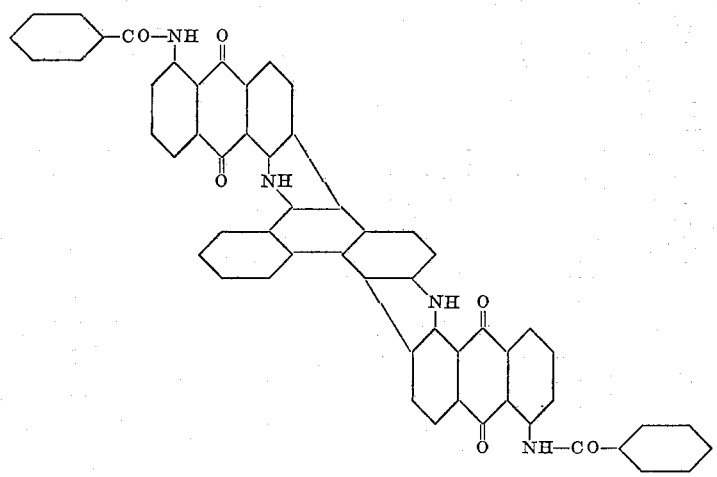

a product which is identical with that obtained by causing concentrated sulfuric acid to react with di-(5'-benzoyl-amino-1'-anthraquinonyl)-6:10-diaminophenanthrene.

It is to be understood that in the formulae appearing in the appended claims hydrogen is assumed where no substituent is indicated.

What we claim is:

1. Vat dyestuffs of the formula

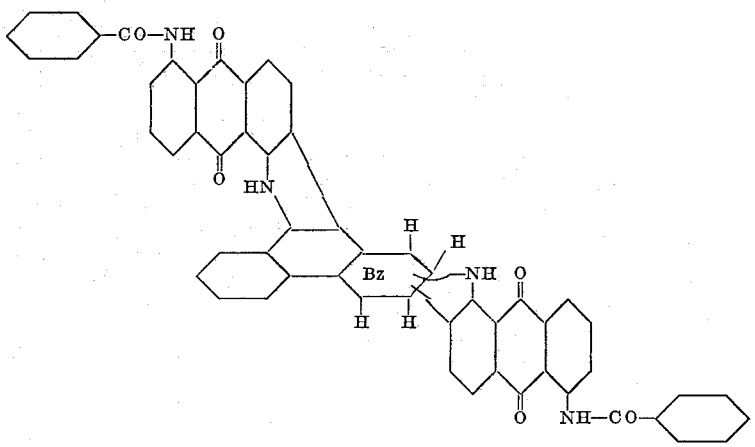

2. The vat dyestuff of the formula

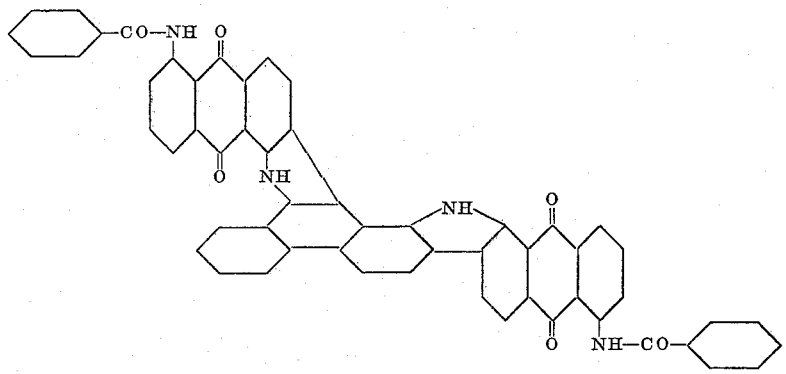

WALTER KERN.
THEODOR HOLBRO.
RICHARD TOBLER.